(12) United States Patent
Seegel

(10) Patent No.: US 11,766,839 B2
(45) Date of Patent: Sep. 26, 2023

(54) DEVICE AND METHOD FOR PRODUCING A COMPONENT

(71) Applicant: Airbus Operations GmbH, Hamburg (DE)

(72) Inventor: Hauke Seegel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 351 days.

(21) Appl. No.: 16/539,079

(22) Filed: Aug. 13, 2019

(65) Prior Publication Data

US 2020/0055265 A1    Feb. 20, 2020

(30) Foreign Application Priority Data

Aug. 16, 2018  (DE) ..................... 10 2018 119 968.6

(51) Int. Cl.
*B29C 70/34*    (2006.01)
*B29C 70/44*    (2006.01)
*B29D 99/00*    (2010.01)

(52) U.S. Cl.
CPC .......... *B29C 70/342* (2013.01); *B29C 70/443* (2013.01); *B29D 99/0003* (2013.01)

(58) Field of Classification Search
CPC ............ B29C 2043/3649; B29C 70/34; B29C 70/342; B29C 70/345; B29C 70/44; B29C 70/443; B29C 70/446; B29C 70/54; B29C 2043/3644; B29C 2043/3647; B30B 5/02; B30B 9/22
See application file for complete search history.

(56) References Cited

U.S. PATENT DOCUMENTS 1,806,861 A * 5/1931 Owen ..................... B30B 5/02
                                                100/211
2010/0196637 A1  8/2010 Lippert et al.
2015/0217487 A1  8/2015 Louie et al.

FOREIGN PATENT DOCUMENTS

EP    2902176 A1     8/2015
JP    2015229304 A   12/2015
WO    2008119491 A2  10/2008

OTHER PUBLICATIONS

German Search Report; priority document.
European Search Report for corresponding European Patent Application No. 19191402 dated Jan. 8, 2020.

* cited by examiner

*Primary Examiner* — Yunju Kim
(74) *Attorney, Agent, or Firm* — Greer, Burns & Crain, Ltd.

(57) ABSTRACT

A device and method for producing a component. The device is composed of two mold elements, wherein one of the mold elements has a cavity which communicates with the position of one side of a component to be produced. An inflatable tube which is fluidically linked to the surrounding atmosphere is provided in the cavity. A cover covers the first and the second mold element and seals the first and said second mold element in relation to the surrounding atmosphere. The tube is expanded by applying a vacuum within the sealed regions and the tube can shape or facilitate shaping the side of the component to be produced.

10 Claims, 3 Drawing Sheets

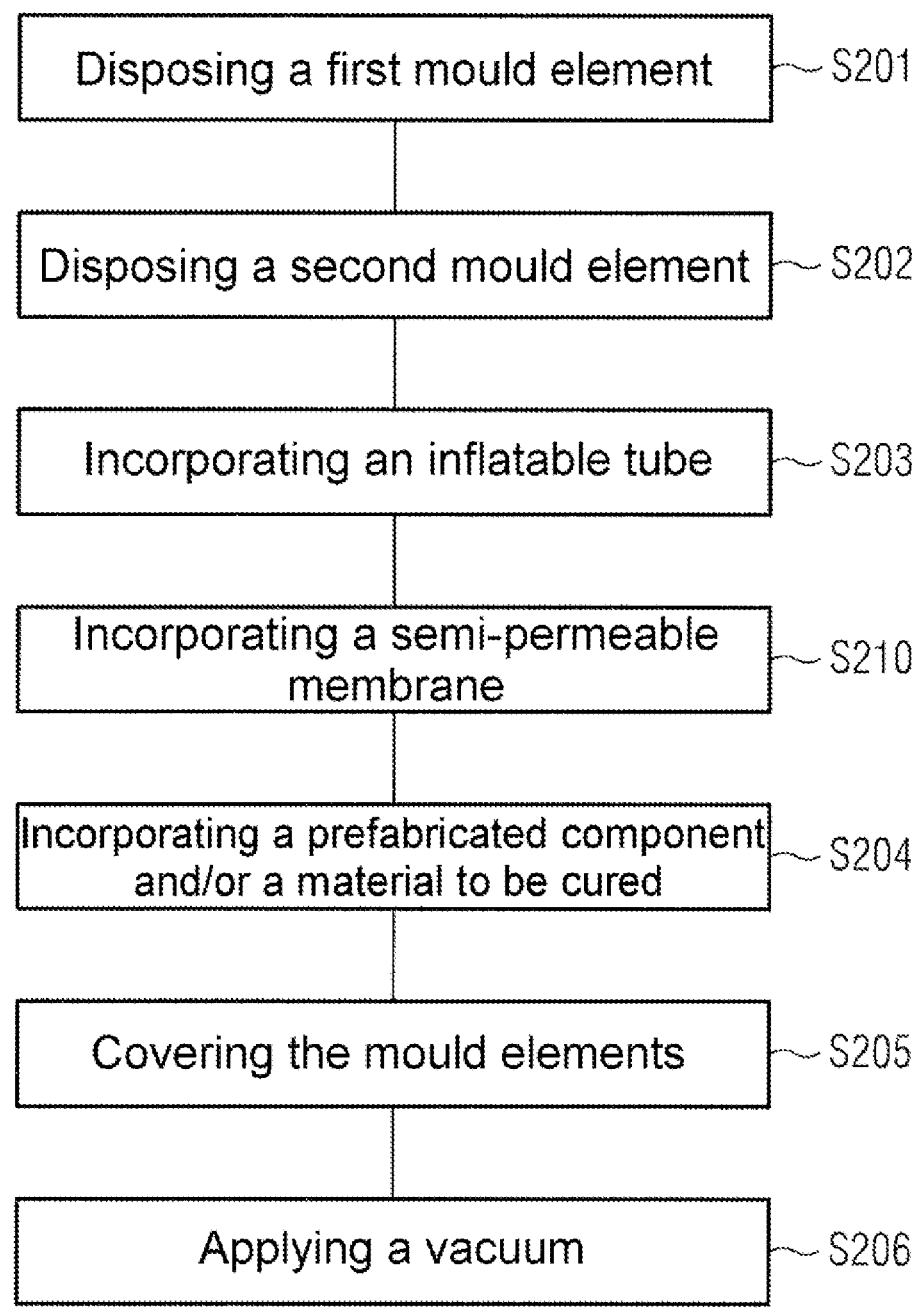

DEVICE AND METHOD FOR PRODUCING A COMPONENT

CROSS-REFERENCES TO RELATED APPLICATIONS

This application claims the benefit of the German patent application No. 10 2018 119 968.6 filed on Aug. 16, 2018, the entire disclosures of which are incorporated herein by way of reference.

FIELD OF THE INVENTION

The invention relates to a device and a method for producing a component. The invention relates, in particular, to a device and a method for producing the component by means of two mold elements (also referred to as "tooling") and a tube that is disposed in a cavity of one of the two mold elements.

BACKGROUND OF THE INVENTION

Shaping an end side is difficult when producing components, in particular components containing resin and/or fiber-reinforced components. An end side herein is understood to be a narrow side that runs in a direction of the component, which is disposed between two sides having a comparatively larger area (having an area that is larger than that of the end side). On account of this special shape, damage to the end side can arise when curing the resin or even in the shaped unfinished state.

For example, a construction element 20 which has a portion having an end side 21 is illustrated in FIG. 1. Fissures in the end side 21 illustrated at the top in FIG. 1 can arise when curing the resin, or air pockets 101 which remain after curing can be created, such as is illustrated on the left in FIG. 1.

A similarly undesirable effect can likewise arise in the case of fiber-reinforced components 20 (composite elements). The fibers can be compressed or be pushed sideways of the position thereof by a mold or mold portion that forms the end side 21 after the fibers have been incorporated in the mold (or when incorporating a prefabricated component having a fiber-reinforced insert (prepreg) in the mold). For example, different fibers or fiber tiers can be pushed apart as arises in delamination. This is illustrated by the fibers which are illustrated in dashed lines in FIG. 1. An undesirable gap 101 in the end side 21 can be created herein in the later finished (cured) component 20.

A further disadvantageous effect, also referred to as the book effect, is created in the production of fiber-reinforced curved components. Different tiers of fibers lying on top of one another herein are displaced in relation to one another on account of the curvature, in a manner similar to the pages of a book, such that the fiber tiers terminate at dissimilar positions at one end (an end side of the component).

The book effect can thus also lead to a gap similar to the gap 101 being created by virtue of the fiber tiers of dissimilar lengths, the gap being at least in part filled by additional resin 102, such as is illustrated on the right in FIG. 1. It has indeed been attempted to provide a certain additional space at the end side in the mold and to incorporate more resin than necessary in the mold, wherein the excess cured resin 102 later has to be removed in order for the component to be rendered to the desired shape (size). Otherwise, all fiber tiers initially would have to be cut to the same length at one end (the future end side of the component). An additional operative step is required in both cases.

SUMMARY OF THE INVENTION

The invention is based on an object of providing a device and a method for producing a component by way of which device/method the component can be produced in a more uniform, more reliable and also a more rapid manner.

According to a first aspect, the device for producing a component comprises a first mold element and a second mold element. The first mold element herein on one side can be configured for shaping at least one portion of the component to be produced, and the second mold element can have a cavity and be specified for being disposed on the first mold element such that the cavity communicates with one side of the component to be produced.

The component to be produced can be a component from a resin to be cured. Alternatively or additionally, the component to be produced can be a fiber-reinforced component and/or a fiber-reinforced composite material component. The side of the component to be produced does not have to protrude into the cavity of the second mold element (upon complete curing of the component). Rather, the side can also be formed in a region that is defined by the first mold element and that communicates with the cavity of the second mold element.

The cavity of the second mold element thus serves for providing the region in which the side is to be formed. Instead of being formed by a rigid mold element, the side of the component to be produced is formed by other components. An inflatable tube can thus be disposed in the cavity. The cavity therefore does not serve for receiving material for producing the component, as is the case in commonplace mold parts, but rather serves for producing the side of the component in a flexible manner without fixed shape-imparting mold parts.

The device can furthermore have a cover which covers the first mold element and the second mold element and seals the first mold element and the second mold element in relation to the surrounding atmosphere. The cover herein can completely enclose the first and the second mold element. Alternatively or additionally, the first and/or the second mold element can also be mounted on a work surface or another hard surface, wherein the cover is fastened in a fluid-tight manner to the work surface or the hard surface.

The interior of the inflatable tube herein is fluidically linked to the surrounding atmosphere. In other words, the interior of the inflatable tube is not sealed in relation to the surrounding atmosphere by the cover. For example, the cover can have an opening while the tube around the opening is connected in a fluid-tight manner to the seal assembly. Alternatively or additionally, the cover at the opening can be configured so as to be tubular, wherein the tubular cover portion is connected to the tube or transitions to the tube.

The side of the component to be produced can be an end side of the component to be produced. The first mold element on one side herein can be configured for shaping at least one portion of the component to be produced, with the exception of the end side. Furthermore, the position of the cavity can communicate with the end side of the component to be produced, thus span the end side of the component to be produced.

In one further variant of design embodiment the device can comprise a semi-permeable membrane which is disposed between the inflatable tube and the (future) (end) side of the component to be produced. The semi-permeable membrane thus prevents any contact between the inflatable tube and the component to be produced, for example the end side of the latter. On the other side, the semi-permeable membrane protects the inflatable tube from the material of the component to be produced so that the tube can be re-used for a plurality of components without having to be cleaned. The semi-permeable membrane permits gases, in particular air, to escape but is impermeable to substances having a higher viscosity such as resin, for example.

A ventilation layer, a so-called breather, can be inserted between the semi-permeable membrane and the tube in order for gases, in particular air, to be better discharged.

In one refinement the semi-permeable membrane can be disposed between the first mold element and the second mold element and span the side of the component to be produced. In other words, the semi-permeable membrane spans a cavity or an opening of the first mold element in which cavity/opening the component to be produced is shaped. For example, the semi-permeable membrane can be jammed between the first and the second mold element so that no dedicated mounting for the membrane is required. By virtue of the semi-permeability of the membrane, the cavity or the opening up to the membrane can thus be completely utilized for shaping the component to be produced, wherein the membrane retains resin and thus shapes the side of the component to be produced.

Alternatively or additionally, the device can comprise a seal element which is disposed between the semi-permeable membrane and the first mold element and/or between the semi-permeable membrane and the second mold element. Two seal elements can also be disposed on both sides of the semi-permeable membrane, wherein one of the seal elements faces the first mold element while the other one of the seal elements faces the second mold element. Sealing in relation to leaking resin between the two mold elements is achieved in either case.

In one further variant of design embodiment, the semi-permeable membrane can be configured so as to be tubular and encloses the inflatable tube. Here too, the inflatable tube is protected from resin of the component to be produced. For example, the semi-permeable membrane can be pulled over the tube. Alternatively, the tube can also be coated with a material that shapes the semi-permeable membrane. Here too, a breather for better ventilation can be provided between the membrane and the tube.

Alternatively or additionally the semi-permeable membrane at least in portions can be pre-shaped. For example, the semi-permeable membrane can be composed of a material that is dimensionally stable in relation to resin. Furthermore, the pre-shaped portion, or the entire semi-permeable membrane, respectively, can be specified for shaping the side of the component to be produced. In other words, the semi-permeable membrane keeps the resin of the component to be produced in shape until the resin cures.

In one further variant of design embodiment, the device comprises a vacuum source which is specified for applying a vacuum in the region which is sealed by the cover and in which the first mold element and the second mold element are situated. On account thereof, air is removed from a space which is defined by the first mold element and the second mold element and in which the component is produced. This facilitates the incorporation of resin to be cured or another material, and prevents the formation of gas bubbles (air bubbles) in the resin/material to be cured. Furthermore, the cover is pressed onto the first and the second mold element, on account of which the component to be produced can be produced in a reliable manner in terms of shape.

Since the interior of the inflatable tube is fluidically linked to the surrounding atmosphere, the tube expands on account of applying the vacuum in the cavity of the second mold element. The tube is indirectly inflated, so to speak. On account thereof, the tube forms a mold element that shapes the (end) side of the component. In particular in the case of a disposal of a pre-shaped semi-permeable membrane, the tube can support the membrane from the cavity side such that the semi-permeable membrane forms a dimensionally stable mold element for the end side of the component to be produced. The inflatable tube herein causes a homogenous distribution of pressure on the semi-permeable membrane, on account of which a homogenous side (more specifically the face of the side) of the component to be produced is produced.

In the case of resin being injected under pressure into the first mold element in the production of the component, the interior of the inflatable tube can also be impinged with pressure. For example, air can be forced into the tube by means of a pump so as to counteract the injection pressure. The pressure in the tube herein should at all times be somewhat higher than the injection pressure.

In one further variant of design embodiment, the first mold element can be configured in two parts. An intermediate space in which the component to be produced is made is provided between the two parts of the mold element. For example, the two parts of the mold element can be disposed so as to be mutually spaced apart such that the two parts form the sides of the component, the lateral edge of the component lying therebetween. The intermediate space can be fixed by corresponding spacers between the two parts of the first mold element. The spacers are preferably disposed outside the region in which the component is produced.

The spacers can also be formed by a further inflatable tube or be supported by such an inflatable tube. When the further inflatable tube is also fluidically linked to the surrounding atmosphere, the tube inflates in the intermediate space of the two parts of the mold element. On account thereof, the two parts of the mold element are uniformly impinged with pressure and are thus kept apart in a uniform manner Such an inflatable tube can also serve as a spacer between two mold elements, wherein each of the mold elements shapes another component or an entirely different portion of the component to be produced.

Furthermore, the second mold element can bear on both parts of the first mold element. In other words, the second mold element spans the two parts of the first mold element. The cavity of the second mold element herein communicates with the intermediate space between the two parts of the first mold element. At least the intermediate space transitions to the cavity. For example, the cavity can have a greater width than the spacing of the two parts of the first mold element that defines the intermediate space.

The device thus permits the production of a component, in particular a component having an end side, wherein the device does not have any (rigid or fixed) mold elements. The cavity and the intermediate space of the two mold elements permit reinforcement fibers or a prepreg to be incorporated without the fibers being stressed (for example, compressed). Moreover, this permits the production of a component without subsequent post-processing being required. In other words, components having the desired shape, thus so-called near net shape components, can be directly produced.

According to a further aspect, a method for producing a component comprises the following steps:

disposing a first mold element which has a shape which corresponds to at least one portion of the component to be produced;

disposing a second mold element having a cavity on the first mold element such that the cavity communicates with one side of the component to be produced;

incorporating an inflatable tube in the cavity;

incorporating a prefabricated component and/or a material to be cured in the first mold element;

covering the first mold element and the second mold element with a cover which seals the first mold element and the second mold element in relation to the surrounding atmosphere;

applying a vacuum in the region which is sealed by the cover and in which the first mold element and the second mold element are situated, wherein the interior of the inflatable tube is fluidically linked to the surrounding atmosphere.

The sequence of the steps of disposing and incorporating herein is irrelevant, and the steps can be performed in any arbitrary sequence. For example, incorporating the inflatable tube in the cavity can also be performed only after incorporating the pre-fabricated component and/or the material to be cured.

In one refinement, the method can also comprise incorporating a semi-permeable membrane between the inflatable tube and the side of the component to be produced. In other words, a semi-permeable membrane can be incorporated and disposed between the cavity of the second mold element and a region of the first mold element in which the component to be produced is made. This step can also be carried out independently of the sequence of the method steps listed above. For example, incorporating the semi-permeable membrane can be performed prior to incorporating an inflatable tube in the cavity.

The aspects, refinements, design embodiments, and variants described here can be combined in an arbitrary manner such that further variants of design embodiments that are not explicitly described are included in the present disclosure.

BRIEF DESCRIPTION OF THE DRAWINGS

Exemplary embodiments of the invention will be described hereunder by means of the drawings.

FIG. 4 shows a sequence diagram of an exemplary method for producing a component comprising an end side.

DETAILED DESCRIPTION OF THE PREFERRED EMBODIMENTS

According to the present invention, a device and a method for producing a component comprising an end side are described.

Figure 1:
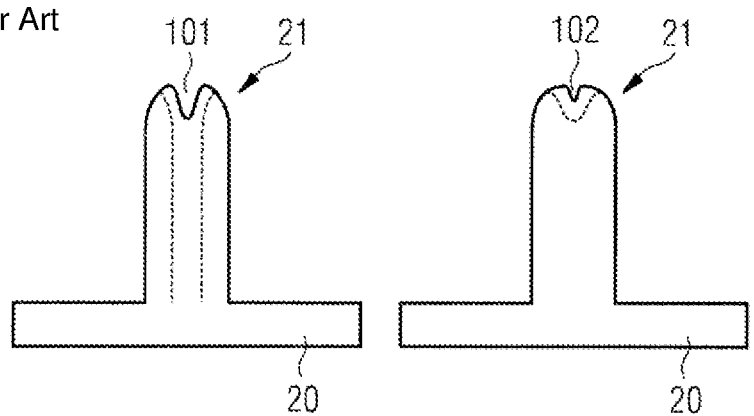
FIG. 1 schematically shows cross sections of components produced in a conventional manner, the components having a defective end side.
Figure 2:
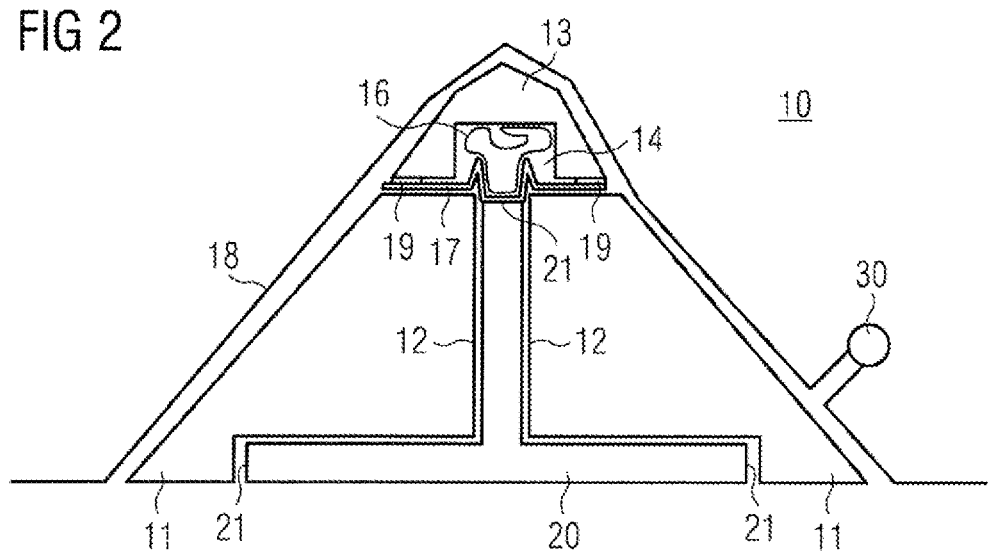
FIG. 2 schematically shows a cross section of a device for producing a component comprising an end side.

FIG. 2 schematically shows a cross section of a device 10 for producing a component 20 comprising an end side 21. The arrangements and procedures described here in the context of the end side 21 can of course also be applied to or performed on another side or another portion of the component 20 to be produced. The component 20 is produced with the aid of a first mold element 11 and a second mold element 13. The first mold element 11 herein can be designed in one part or multiple parts (for example in two parts, as is illustrated). The first mold element 11 has at least one side 12 which shapes a portion of the component 20 to be produced, with the exception of the end side 21. The first mold element 11 illustrated serves for producing a T-shaped component 20.

While the end sides 21 illustrated at the bottom in FIG. 2 are shaped by the first mold element 11, the end side 21 of the component 20 to be produced lies in a region which is specified by a cavity 14 of the second mold element 13. In other words, neither the first mold element 11 nor the second mold element 13 has a rigid portion which shapes the end side 21 of the component 20 to be produced. Rather, an inflatable tube 16, the interior thereof being fluidically linked to the surrounding atmosphere, is provided in the cavity 14.

A cover 18 is disposed about the first mold element 11 and the second mold element 13, covers the two mold elements 11, 13 and seals the mold elements 11, 13 in relation to the surrounding atmosphere. As is illustrated in FIG. 2, the cover 18 can be fastened in a fluid-tight manner on a work surface (not illustrated) or can alternatively completely enclose the mold elements 11, 13.

Optionally to the inflatable tube 16, a semi-permeable membrane 17 can be provided. The semi-permeable membrane 17 can be disposed between the tube 16 and the component 20 to be produced, in particular on the end side 21 to be produced of the latter. For example, the semi-permeable membrane 17 can at least in portions be pre-shaped such that the pre-shaped portion of the membrane 17 shapes the end side 21 of the component 20 to be produced.

In the variant illustrated in FIG. 2 the semi-permeable membrane 17 is disposed between the first mold element 11 and the second mold element 13 and spans the end side 21 of the component 20 to be produced. In other words, the membrane 17 spans an intermediate space in the first mold element 11 in which the component 20 to be produced is made.

Figure 3:
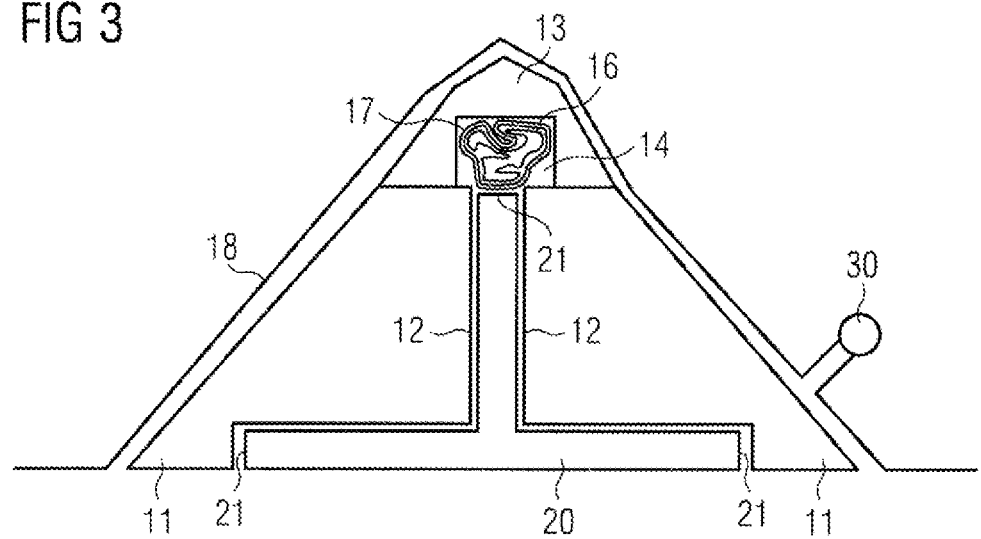
FIG. 3 schematically shows a cross-section of a variant of a device for producing a component comprising an end side.

FIG. 3 schematically shows a cross-section of a variant of a device 10 for producing a component 20 comprising an end side 21. In this variant, the semi-permeable membrane 17 encloses the inflatable tube 16. To this end, the membrane 17 is configured so as to be tubular or is attached to an external side of the tube 16.

While only illustrated in FIG. 2, a seal element 19 can be disposed between the first mold element 11 and the second mold element 13 in either of the two variants of the device 10. For example, a seal element 19 can be disposed between the first mold element 11 and the semi-permeable membrane 17, or between the semi-permeable membrane 17 and the second mold element 13.

A vacuum source 30 can be provided such that a vacuum is applied in the region which is sealed by the cover 18 and in which the first mold element 11 and the second mold element 13 are situated. In other words, a fluid (gas or liquid) is removed by the vacuum source 30 from all of the intermediate spaces and cavities of the first and the second mold elements 11, 13. The material (for example a resin) for the production of the component 20 can be incorporated prior thereto or simultaneously in the intermediate spaces and cavities of the mold elements 11, 13. The component 20 to be produced can also comprise fibers which previously have been inserted, for example in the form of a prefabricated component (prepreg), in particular in the intermediate spaces of the first mold element 11. The vacuum source 30 also removes fluid, in particular air, that is contained between the fibers. By contrast, the material (resin) used for the production of the component 20 is retained by the semi-permeable membrane 17.

The tube 16 expands in the cavity 14 on account of the vacuum being applied and the interior of the inflatable tube 16 being fluidically linked to the surrounding atmosphere. The tube 16 herein, by virtue of the atmospheric pressure, presses on the material of the component 20 to be produced, in particular on the end side 21 to be configured/produced, or on the optionally provided semi-permeable membrane 17. Fluid from the intermediate space of the first mold element 11 can be guided through the semi-permeable membrane to the vacuum source 30. A ventilation layer (breather) which for reasons of clarity is not illustrated in the figures can be disposed on the semi-permeable membrane 17 in order for the fluid to be better discharged. This type of shaping of the end side 21 however avoids the deformation of fibers in the component to be produced, as usually arises by virtue of a rigid mold element. Furthermore, the interior space of the mold elements is also delimited such that no accumulation of excess resin which later would have to be removed can form.

On account thereof, the end side 21, such as required for the component 20, is formed in the mold without post-processing being required (so-called near net shape production). Of course, the remaining end sides 21 of the component 20 to be produced, and also the sides lying therebetween, as well as further elements of the component 20 can be shaped by such a second mold element 13 and an inflatable tube 16, as well as optionally a membrane 17.

The shape of the second mold element 13, as well as of the cavity 14 included therein illustrated in the figures, can be adapted so as to depend on the component to be produced. The cavity 14 can thus also occupy almost the entire volume which in the figures is shown by the second mold element 13. It is thus sufficient for the second mold element 13 to be composed of only a thin layer of stable material which prevents the cover 18 from compressing the inflatable tube 16 when a vacuum is applied.

FIG. 4 shows a sequence diagram of an exemplary method for producing such a component 20 comprising an end side 21. First, in step S201 a first mold element 11 which has a shape which corresponds to at least one portion of the component 20 (with the exception of the end side 21) is disposed. Subsequently, a second mold element 13 having a cavity 14 is disposed on the first mold element 11 (step S202). The cavity 14 herein can communicate with the position of the end side 21 of the component 20 to be produced.

The method can furthermore comprise incorporating (step S203) an inflatable tube 16 in the cavity 14 as well as incorporating (step S204) a prefabricated component and/or a material to be cured in the first mold element 11. The sequence of steps S201 to S204 herein is irrelevant.

In an optional variant of the method, in step S210 a semi-permeable membrane 17 can be incorporated between the inflatable tube 16 and the (end) side 21 of the component 20 to be produced. The membrane 17 herein is at least partially incorporated in the cavity 14 of the second mold element 13 such that the membrane 17 covers an intermediate space of the first mold element 11 in which the component 20 is made. The membrane 17 herein can be designed in such a manner that the membrane 17 shapes the end side 21 of the component 20 in the intermediate space.

The method can furthermore comprise covering (step S205) the first mold element 11 and the second mold element 13 with a cover 18 which seals the first mold element 11 and the second mold element 13 in relation to the surrounding atmosphere. Subsequently, in step S206 a vacuum can be applied in the region which is sealed by the cover 18 and in which the first mold element 11 and the second mold element 13 are situated. The interior of the inflatable tube 16 is fluidically linked to the surrounding atmosphere. On account thereof, the tube 16 is expanded when the vacuum is applied (S206) and forms a flexible but specified shape for the end side 21 of the component 20 to be produced.

The variants, design embodiments, and exemplary embodiments discussed above serve only for describing the claimed teaching but do not limit the latter to the variants, design embodiments, and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for producing a cured resin or fiber-reinforced component, wherein the device comprises:
 a first mold element which on one side is configured for shaping at least one portion of the cured resin or fiber-reinforced component to be produced;
 a second mold element which has a cavity, wherein the second mold element is specified for being disposed on the first mold element such that the cavity communicates with one exterior end side of the cured resin or fiber-reinforced component to be produced, wherein neither the first mold element nor the second mold element has a portion which shapes the one exterior end side of the cured resin or fiber-reinforced component to be produced;
 an inflatable tube disposed in the cavity for forming the one exterior end side of the cured resin or fiber-reinforced component; and
 a cover which covers the first mold element and the second mold element and seals said first mold element and said second mold element in relation to a surrounding atmosphere,
 wherein the interior of the inflatable tube is fluidically linked to the surrounding atmosphere, and
 wherein the one exterior end side of the cured resin or fiber-reinforced component comprises a narrow side that runs in a direction of the component, which is disposed between two sides having a comparatively larger area.

2. The device according to claim 1, further comprising:
 a semi-permeable membrane disposed between the inflatable tube and the cured resin or fiber-reinforced component to be produced.

3. The device according to claim 2, wherein the semi-permeable membrane is disposed between the first mold element and the second mold element and spans the exterior end side of the cured resin or fiber-reinforced component to be produced.

4. The device according to claim 3, further comprising:
a seal element disposed between the semi-permeable membrane and the first mold element, or between the semi-permeable membrane and the second mold element.

5. The device according to claim 2, wherein the semi-permeable membrane is configured so as to be tubular and encloses the inflatable tube.

6. The device according to claim 2, wherein the semi-permeable membrane, at least in portions, is pre-shaped and the pre-shaped portions are specified for shaping the exterior end side of the cured resin or fiber-reinforced component to be produced.

7. The device according to claim 1, further comprising:
a vacuum source configured to apply a vacuum in a region sealed by the cover and in which the first mold element and the second mold element are situated.

8. The device according to claim 1, wherein the first mold element is configured in two parts, and wherein the second mold element bears on both parts of the first mold element.

9. A method for producing a cured resin or fiber-reinforced component, wherein the method comprises the following steps:
disposing a first mold element which has a shape which corresponds to at least one portion of the cured resin or fiber-reinforced component to be produced;
disposing a second mold element having a cavity on the first mold element such that the cavity communicates with one exterior end side of the cured resin or fiber-reinforced component to be produced, wherein neither the first mold element nor the second mold element has a portion which shapes the one exterior end side of the cured resin or fiber-reinforced component to be produced;
incorporating an inflatable tube for forming the one exterior end side of the cured resin or fiber-reinforced component in the cavity;
incorporating at least one of a prefabricated component or a material to be cured in the first mold element;
covering the first mold element and the second mold element with a cover which seals the first mold element and the second mold element in relation to a surrounding atmosphere;
applying a vacuum in a region sealed by the cover and in which the first mold element and the second mold element are situated,
wherein the interior of the inflatable tube is fluidically linked to the surrounding atmosphere, and
wherein the one exterior end side of the cured resin or fiber-reinforced component comprises a narrow side that runs in a direction of the component, which is disposed between two sides having a comparatively larger area.

10. The method according to claim 9, comprising: incorporating a semi-permeable membrane between the inflatable tube and the exterior end side of the cured resin or fiber-reinforced component to be produced.

* * * * *